United States Patent [19]

Witt

[11] Patent Number: 4,887,803

[45] Date of Patent: Dec. 19, 1989

[54] POWER ACTUATED CAM CLAMP

[76] Inventor: Larry M. Witt, 53260 Bellamine, Rochester, Mich. 48064

[21] Appl. No.: 294,824

[22] Filed: Jan. 9, 1989

[51] Int. Cl.[4] .................................. B23Q 3/08

[52] U.S. Cl. .................................. 269/32; 269/94; 269/229

[58] Field of Search .................................. 269/91-94, 269/228, 239, 232, 233, 229, 32

[56] References Cited

U.S. PATENT DOCUMENTS

| | | | |
|---|---|---|---|
| 2,236,439 | 3/1941 | McKenna | 269/239 |
| 2,456,100 | 12/1948 | Wood | 269/94 |
| 2,537,594 | 1/1951 | Lehmann | 269/239 |
| 2,616,460 | 11/1952 | Carlson | 269/32 |
| 2,815,052 | 12/1957 | Krasnow | 269/32 |
| 2,941,432 | 6/1960 | Williamson | 269/232 |
| 3,204,947 | 9/1965 | Sendoykas | 269/94 |
| 4,444,739 | 1/1985 | Valentine | 269/32 |

*Primary Examiner*—Robert C. Watson
*Attorney, Agent, or Firm*—Lloyd M. Forster

[57] ABSTRACT

Power actuated cam clamp having mounting base with side flanges for pivotally mounted cam surfaced clamp arm, cam roller actuating link, and fluid cylinder elements. Uniform cam rise providing self-locking angle over substantial clamp range and rapid travel 90° opening are accomplished with direct piston rod actuation of roller link.

6 Claims, 1 Drawing Sheet

POWER ACTUATED CAM CLAMP

BACKGROUND OF THE INVENTION

Power clamps are known in the art for mounting on a base, with a clamp arm actuated by air or hydraulic cylinder through a toggle linkage which reaches a fixed clamping position when three pivot points of the linkage reach a straight line or slightly overcenter position.

Power clamps aare also known which employ a roller and cam principle where a pivoted clamp arm having an integral roller track is actuated by a straight line piston having reaction rollers confined to a straight line reaction track.

U.S. Pat. No. 4,576,367 discloses a power clamp having a pivoted arm with cam track engaged by a roller on a pivoted link actuated by toggle linkage through a straight line power piston. Several toggle links are involved in addition to the pivoted link defining the circular arc travel of the roller.

BRIEF DESCRIPTION OF THE PRESENT INVENTION

An improvement in the type of clamp disclosed in the above referenced Patent has been achieved by pivotally mounting the cylinder body and directly actuating the roller arm with a piston rod thereby eliminating all intervening toggle linkage of the reference Patent.

DETAILED DESCRIPTION OF PREFERRED EMBODIMENT

Figure 2:
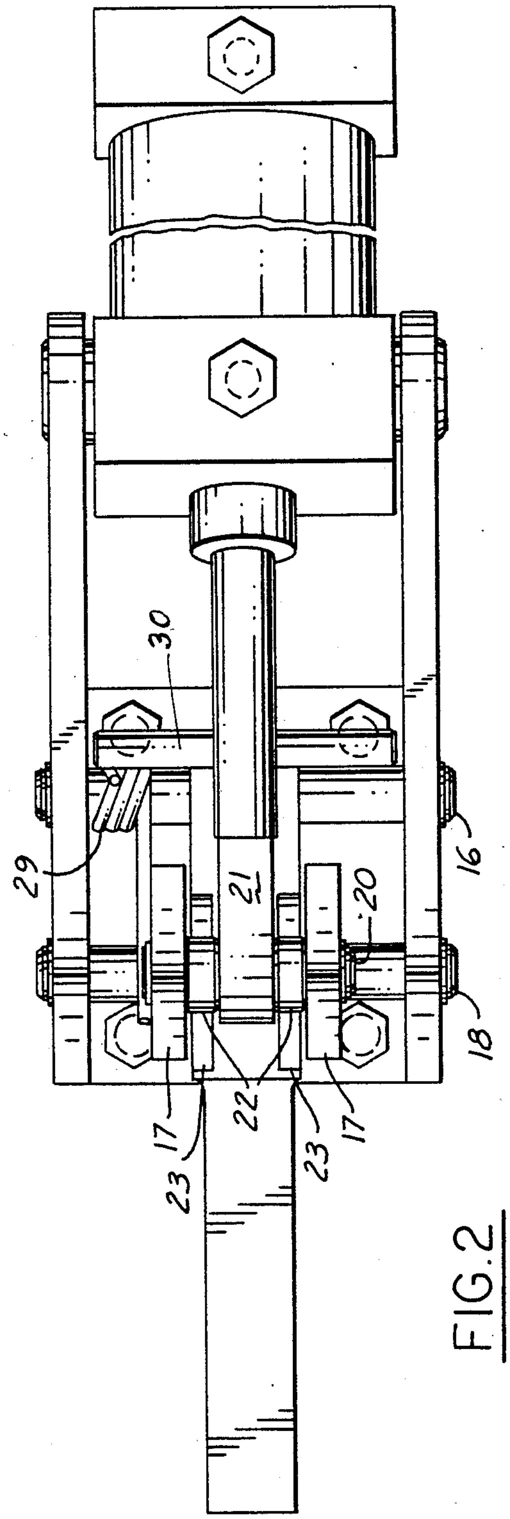
FIG. 2 is a plan view of the clamp shown in FIG. 1.
Figure 1:
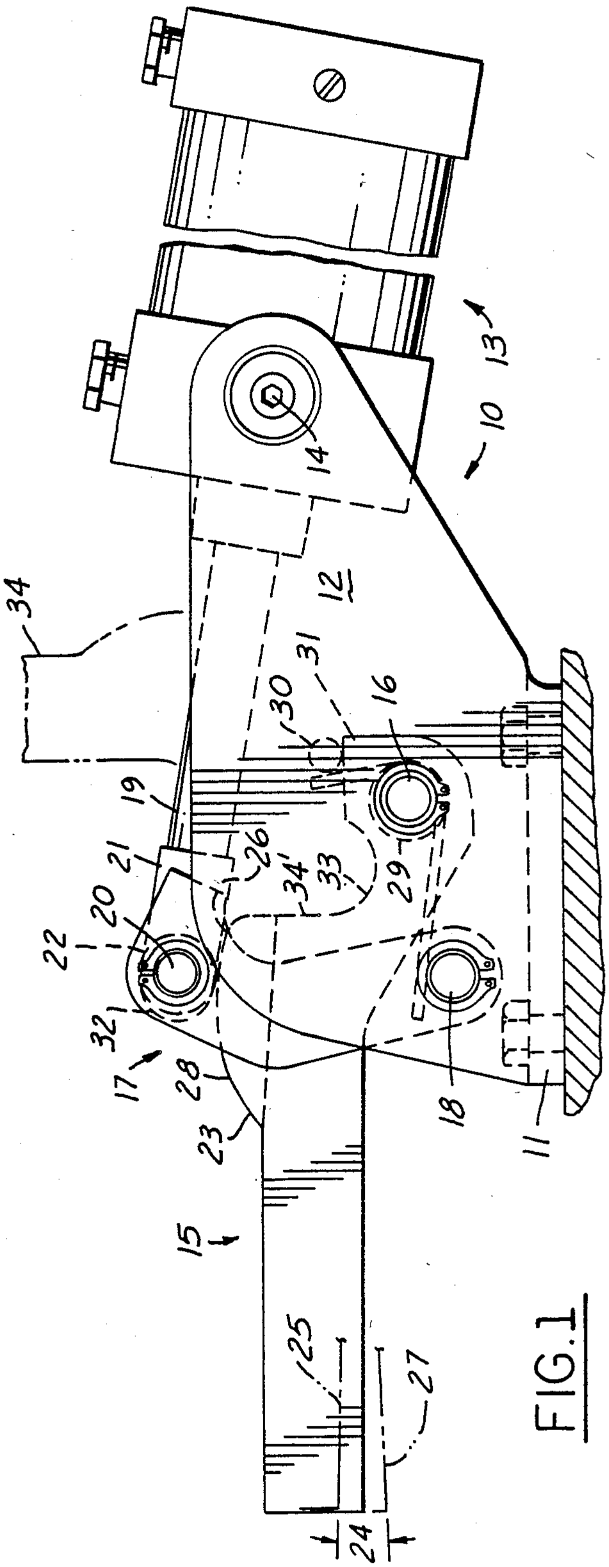
FIG. 1 is a side elevation layout of the power actuated cam clamp of the present invention.

With reference to the drawings, base 10 comprises a formed burnout, forging, casting or weldment having flat mounting plate 11 and side flanges 12 on which are pivotally mounted, cylinder 13 at 14, clamp arm 15 at pivot 16, and a pair of links 17 at pivot 18. Piston rod 19 is connected to upper ends of link 17 by crosspin 20 passing through central rod end 21 and cam rollers 22 engaging cam surfaces 23 on clamp arm 15 contoured with radial progressive dimension from pivot 18 increasing in a counterclockwise direction as illustrated in FIG. 1.

Clamp arm 15 is shown in a neutral position between extremities of effective clamp range 24 extending between an upper extremity 25 corresponding to roller 22 engagement at minimum radius end 26 of cam surfaces 23 and lower extremity 27 corresponding to maximum radius end 28 of cam surfaces 23.

A uniform cam rise of less than 8°, i.e., less than the angle of friction for steel surfaaces involved, provides a self-locking angle throughout the clamping range of cam surfaces 23 with more than a 7:1 mechanical advantage in applying clamping force to the cam surfaces.

Upon retraction of piston rod 19, arm retraction is accomplished by links 17 rearward extending surfaces contacting arm pin 30 mounted on tail 31 of clamp arm 15 and camming it back to its vertical (90°) open position.

Upon actuating cylinder 13 to extend piston rod 19, engagement of rod end 32 with clamp arm surface 34 provides a rapid return to a clamping attitude where rollers 32 reengage cam surfaces 23. Coiled spring 29 serves as a cushion for clamp arm 15 as rod 19 extends, so arm 15 does not slam against the workpiece.

Simplification of linkage, incident to the combination of pivoted mounting for cylinder 13 and cam link actuation of the clamp arm, together with self-locking actuation throughout a substantial effective clamping range, render the clamp useful for a variety of applications where a variable workpiece dimension call for a range in clamping stroke. By providing a uniform rise in the cam surfaces, a useful clamping force over the entire range is made possible which may be regulated by the size of cylinder and actuating air pressure. The final clamping position of the clamp arm, as established by the workpiece dimension, will render unnecessary any positive stop or other control provision since reaction of the workpiece, at any predetermined clamp force, will automatically regulate the final clamp position.

I claim:

1. Power actuated cam clamp comprising a clamp base with means for mounting on a support surface, said base including side flanges for pivotal mounting of clamp elements therbetween, said elements icnluding pivotally mounted clamp arm with dual laterally spaced cam surface means, single pivot mounted dual side links laterally spaced outside of said dual cam surface means mounting cam surface engaging actuating linkage rollers, and pivotally mounted power cylinder with direct piston rod actuating connection to said linkage.

2. Cam clamp of claim 1 including a central piston rod connector, and a transverse pivot pin extending laterally through said side links, rollers and connector.

3. Cam clamp of claim 1 wherein said dual cam elements are provided with uniform rise cam surfaces providing substantial effective clamp range.

4. Cam clamp of claim 3 wherein said cam surfaces provide a self-locking angle throughout said range.

5. Cam clamp of claim 3 wherein a clamping position within said range is established by workpiece reaction with clamping force a function of cylinder size and fluid pressure.

6. Cam clamp of claim 1 wherein a cross pin is mounted on a tail projection of said clamp arm engaged by projecting surfaces of said dual side links upon retraction of said piston rod to produce arm retraction.

* * * * *